US009550432B2

(12) United States Patent
Hisano

(10) Patent No.: US 9,550,432 B2
(45) Date of Patent: Jan. 24, 2017

(54) HYBRID VEHICLE HAVING MODE OF INCREASING AMOUNT OF CHARGE STORED IN POWER STORAGE DEVICE TO TARGET VALUE AND CONTROL METHOD FOR HYBRID VEHICLE

(71) Applicant: Toyota Jidosha Kabushiki Kaisha, Toyota-shi, Aichi-ken (JP)

(72) Inventor: Taishi Hisano, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/628,548

(22) Filed: Feb. 23, 2015

(65) Prior Publication Data

US 2015/0298570 A1 Oct. 22, 2015

(30) Foreign Application Priority Data

Apr. 21, 2014 (JP) ................. 2014-087376

(51) Int. Cl.
 *B60L 11/18* (2006.01)
(52) U.S. Cl.
 CPC ........... *B60L 11/1861* (2013.01); *Y02T 10/705* (2013.01); *Y02T 10/7005* (2013.01); *Y02T 10/7044* (2013.01)
(58) Field of Classification Search
 CPC .... B60L 1/1809; B60L 1/1861; B60R 16/033; Y02T 10/705; Y02T 10/7005; Y02T 10/7044; Y02T 10/7072; Y02T 10/92
 See application file for complete search history.

(56) References Cited

U.S. PATENT DOCUMENTS

| 9,073,497 | B2* | 7/2015 | Ogawa et al. | |
|---|---|---|---|---|
| 2008/0084186 | A1* | 4/2008 | Elder et al. | 320/132 |
| 2012/0253572 | A1* | 10/2012 | Ogawa et al. | 701/22 |
| 2013/0289815 | A1* | 10/2013 | Suzuki | 701/22 |
| 2014/0172206 | A1* | 6/2014 | Roos et al. | 701/22 |
| 2014/0229048 | A1* | 8/2014 | Kawata et al. | 701/22 |
| 2014/0257636 | A1* | 9/2014 | Ueki et al. | 701/36 |
| 2014/0371983 | A1* | 12/2014 | Miyashita et al. | 701/36 |
| 2015/0019057 | A1* | 1/2015 | Morisaki et al. | 701/22 |

FOREIGN PATENT DOCUMENTS

| JP | 2003-235108 A | | 8/2003 |
|---|---|---|---|
| JP | 2012-209998 A | | 10/2012 |
| JP | 2013129379 A | * | 7/2013 |

* cited by examiner

*Primary Examiner* — Thomas G Black
*Assistant Examiner* — Ce Li
(74) *Attorney, Agent, or Firm* — Dinsmore & Shohl LLP

(57) ABSTRACT

In a hybrid vehicle, the charging power of a power storage device can be generated through power generation by a motor generator by using an output of an engine. In response to operation of an SOC recovery switch, an ECU executes SOC recovery control for increasing an SOC of the power storage device to an SOC target value. The SOC target value in the SOC recovery control is set to be higher than an SOC control target when the SOC recovery control is not in execution. The ECU variably sets the SOC target value in the SOC recovery control based on a past driving history of the hybrid vehicle.

8 Claims, 7 Drawing Sheets

100

HYBRID VEHICLE HAVING MODE OF INCREASING AMOUNT OF CHARGE STORED IN POWER STORAGE DEVICE TO TARGET VALUE AND CONTROL METHOD FOR HYBRID VEHICLE

This nonprovisional application is based on Japanese Patent Application No. 2014-087376 filed on Apr. 21, 2014 with the Japan Patent Office, the entire contents of which are hereby incorporated by reference.

BACKGROUND OF THE INVENTION

Field of the Invention

The present invention relates to a hybrid vehicle, and more particularly, to a hybrid vehicle having a mode of increasing an amount of charge stored in a power storage device to a target value.

Description of the Background Art

Japanese Patent Laying-Open No. 2003-235108 (hereinafter referred to as "PTD 1") describes a vehicle control device configured to increase an amount of charge (hereinafter also referred to as "SOC (State of Charge)") stored in a battery in response to driver's operation of a charging switch, in order to allow motored traveling in accordance with the driver's intention.

PTD 1 describes that a target charging amount (target SOC) of the battery is increased when a vehicle enters a charging mode in response to operation of the charging switch. In response thereto, an engine output is adjusted as appropriate and power generation is performed by a generator, whereby the SOC can be increased as compared with the SOC at the normal time. For example, PTD 1 describes that the target SOC is normally 60(%), while the target SOC is increased to 70(%) in the charging mode.

SUMMARY OF THE INVENTION

In a hybrid vehicle, even when the charging mode as described in PTD 1 is not selected, the engine output is normally controlled as appropriate in order to control the SOC of the battery to the SOC target value. The energy efficiency of an increase in SOC with respect to fuel consumption (hereinafter also referred to as "charging efficiency") at this time can change depending on a driving tendency of the hybrid vehicle, e.g., a driver's driving pattern and a daily traveling path.

For example, when an operating point at which the power required for vehicle traveling is output is closer to the low output side than an operating point at which the engine efficiency is maximized, the power for charging the battery is added, thereby enhancing the engine efficiency during charging by SOC control. In the case of a driving tendency having a high frequency of such a situation, the charging efficiency in the normal SOC control tends to be high. Conversely, in the case where a frequency of relatively high load traveling is high, an amount of increase in SOC with respect to a fuel consumption amount in the engine is small, and thus, the energy efficiency for increasing the SOC tends to be low.

In addition, the target SOC is different between at the normal time (when the charging mode is not selected) and in the charging mode. Therefore, the energy efficiency for increasing the SOC can vary between both modes.

Thus, it is feared that the energy efficiency decreases and thus the fuel efficiency deteriorates if the mode of increasing the SOC (the charging mode in PTD 1) is equally applied without any consideration of the aforementioned driving tendency of the vehicle.

The present invention has been made to solve the aforementioned problem, and an object of the present invention is to enhance the fuel efficiency of a hybrid vehicle having a mode of increasing an amount of charge (i.e. SOC) stored in a power storage device to a target value.

According to an aspect of the present invention, a hybrid vehicle includes: a mechanism for generating vehicle driving force by using electric power from a power storage device; an internal combustion engine; a power generation mechanism for generating charging power of the power storage device by using an output of the internal combustion engine; an input device; and a control device. The input device is provided for a user to select charging amount recovery control for increasing an amount of charge stored in the power storage device to a target value. The control device is configured to control vehicle traveling with control of the amount of charge. The control device sets the target value in the charging amount recovery control based on a past driving history of the hybrid vehicle, when the charging amount recovery control is started in response to operation of the input device.

According to another aspect of the present invention, there is provided a control method for a hybrid vehicle including an internal combustion engine and a mechanism for generating vehicle driving force by using electric power from a power storage device. The control method includes the steps of: during vehicle traveling, in accordance with a user's instruction, starting charging amount recovery control for increasing an amount of charge stored in the power storage device to a target value by a power generation mechanism for generating charging power of the power storage device by using an output of the internal combustion engine; reading a past driving history of the hybrid vehicle when the charging amount recovery control is started; and setting the target value in the charging amount recovery control, based on the read driving history.

According to the above-described hybrid vehicle and control method therefor, the charging amount in the charging amount recovery control (SOC recovery control) can be changed based on the driving history. Thus, when the charging efficiency tends to be higher at the time of execution of the charging amount recovery control than at the normal time (when the charging amount recovery control is not in execution), the target value in the charging amount recovery control can be increased and the charging amount can be increased. Conversely, when the charging efficiency tends to be lower at the time of execution of the charging amount recovery control than at the normal time (when the charging amount recovery control is not in execution), the charging amount in the charging amount recovery control can be suppressed. As a result, the energy efficiency for charging the power storage device can be enhanced and the fuel efficiency of the hybrid vehicle can be improved.

Accordingly, a main advantage of the present invention is that the fuel efficiency can be enhanced in the hybrid vehicle having the mode of increasing the amount of charge (SOC) stored in the power storage device to the target value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
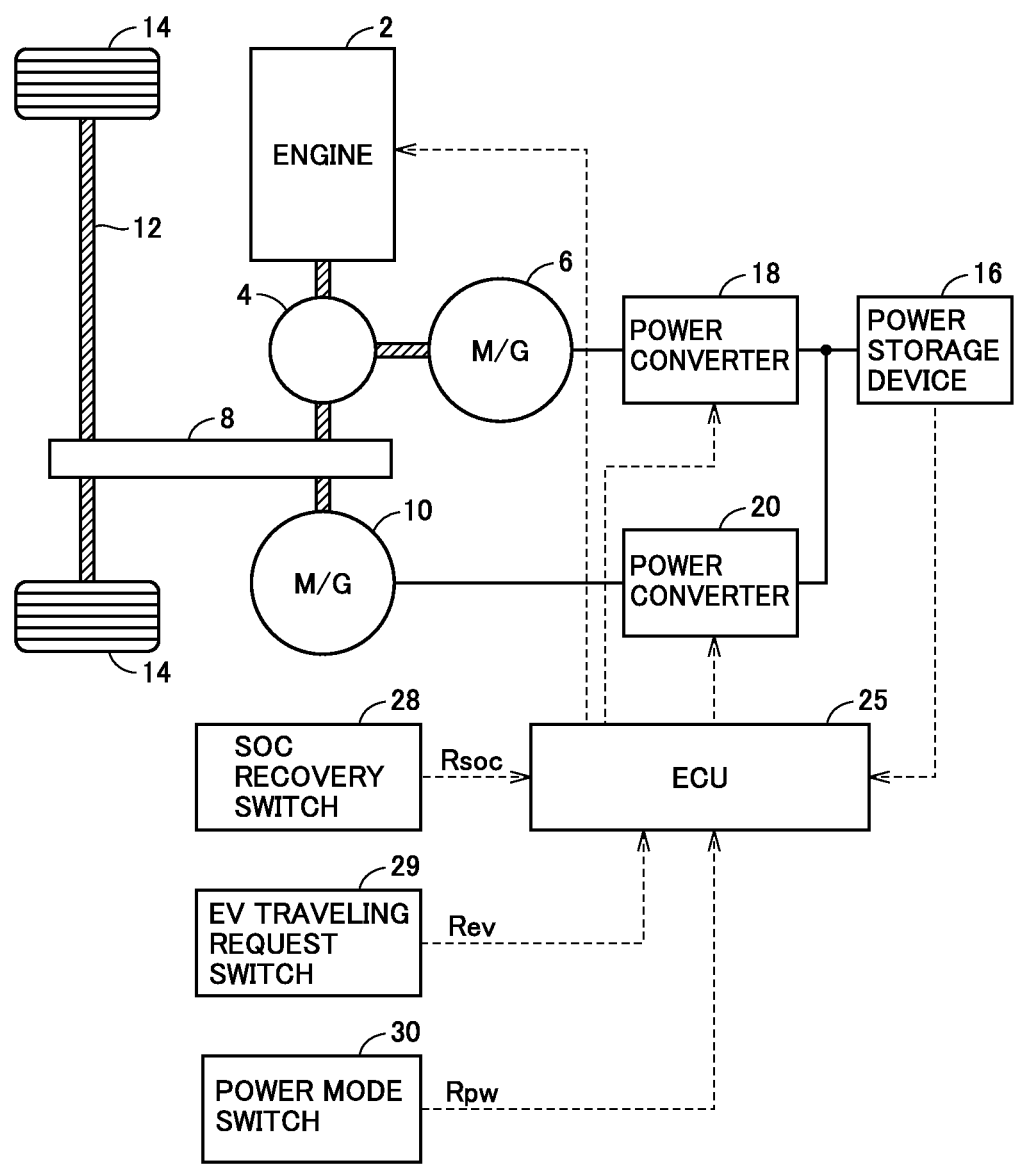
FIG. 1 is a block diagram for describing an overall configuration of a hybrid vehicle according to a first embodiment of the present invention.

Embodiments of the present invention will be hereinafter described in detail with reference to the drawings. In the following description, the same or corresponding portions in the drawings are indicated by the same reference characters and description thereof will not be repeated.

First Embodiment

FIG. 1 is a block diagram for describing an overall configuration of a hybrid vehicle 100 according to a first embodiment of the present invention.

Referring to FIG. 1, hybrid vehicle 100 includes an engine 2, a power split device 4, motor generators 6 and 10, a transmission gear 8, a drive shaft 12, and wheels 14. Hybrid vehicle 100 further includes a power storage device 16, power converters 18 and 20, an ECU (Electronic Control Unit) 25, an SOC recovery switch 28, an EV (Electric Vehicle) traveling request switch 29, and a power mode switch 30.

Engine 2 is an internal combustion engine that outputs motive power by converting thermal energy generated by combustion of fuel into kinetic energy for moving elements such as a piston and a rotor. As the fuel of engine 2, a hydrocarbon-based fuel such as gasoline, light oil, ethanol, liquid hydrogen, or natural gas, or a liquid or gaseous hydrogen fuel is suitable.

Each of motor generators 6 and 10 is an alternating current (AC) rotating electric machine and is formed by, for example, a three-phase AC synchronous motor. Motor generator 6 is used as a generator driven by engine 2 via power split device 4, and is also used as a motor for starting engine 2.

Motor generator 10 mainly operates as a motor and is used to drive drive shaft 12 of hybrid vehicle 100. On the other hand, at the time of deceleration of hybrid vehicle 100, motor generator 10 operates as a generator to perform regenerative power generation.

Power split device 4 includes, for example, a planetary gear mechanism having three rotation shafts of a sun gear, a carrier and a ring gear. Power split device 4 divides the driving force of engine 2 into the motive power transmitted to a rotation shaft of motor generator 6 and the motive power transmitted to transmission gear 8. Transmission gear 8 is coupled to drive shaft 12 for driving wheels 14. Transmission gear 8 is also coupled to a rotation shaft of motor generator 10.

Power storage device 16 is a rechargeable direct current (DC) power supply and is formed by, for example, a secondary battery such as a nickel-metal hydride secondary battery or a lithium ion secondary battery. Power storage device 16 supplies electric power to power converters 18 and 20. In addition, at the time of power generation by motor generator 6 and/or motor generator 10, power storage device 16 receives and is charged with the generated electric power. A large-capacitance capacitor can also be used as power storage device 16. In other words, any element can be applied as power storage device 16 as long as power storage device 16 can temporarily store the electric power generated by motor generators 6 and 10, and supply the stored electric power to motor generators 6 and 10.

A charging state of power storage device 16 is expressed by an SOC value indicating a current amount of stored power with respect to a fully-charged state of power storage device 16 in percentage. The SOC value can be calculated based on, for example, an output voltage and/or an input/output current of power storage device 16 detected by a not-shown voltage sensor and a not-shown current sensor. The SOC value is calculated by ECU 25 based on detection values of the output voltage and the input/output current of power storage device 16.

Power converter 18 performs bidirectional AC/DC power conversion between motor generator 6 and power storage device 16, based on a control signal received from ECU 25. Similarly, power converter 20 performs bidirectional AC/DC power conversion between motor generator 10 and power storage device 16, based on a control signal received from ECU 25. As a result, motor generators 6 and 10 can receive and transmit the electric power to and from power storage device 16, and can output positive torque for operating as a motor and negative torque for operating as a generator. A boost converter for DC voltage conversion may also be arranged between power storage device 16 and power converters 18 and 20.

As a result, motor generator 6 has an operation mode as a generator that generates the charging power of power storage device 16 by using an output of engine 2 transmitted through power split device 4, and thus, motor generator 6 can form "power generation mechanism". In addition, motor generator 10 operates as a motor by using the electric power from power storage device 16, and thus, a mechanism for generating the vehicle driving force by using the electric power from power storage device 16 can be achieved.

ECU 25 includes a CPU (Central Processing Unit), a storage device, an input/output buffer and the like (all are not shown), and controls the devices in hybrid vehicle 100. This control is not limited to processing by software, and can also be executed by dedicated hardware (electronic circuit).

When the traveling load is small and the efficiency of engine 2 is low like during vehicle stop and during traveling at low speed, ECU 25 controls power converter 20 such that engine 2 is stopped and hybrid vehicle 100 travels by using only motor generator 10 (EV traveling). When the traveling load increases and engine 2 can be operated efficiently, ECU 25 controls engine 2 and power converters 18 and 20 such that engine 2 is started and hybrid vehicle 100 travels by using engine 2 and motor generator 10 (HV traveling).

When the SOC value of power storage device 16 becomes smaller than a target value, ECU 25 controls engine 2 and power converter 18 such that power storage device 16 is charged through power generation by motor generator 6 using the output of engine 2. As a result, in hybrid vehicle 100, even during traveling, SOC control for maintaining the SOC value of power storage device 16 at the target SOC is executed by adjusting the output of engine 2 in the HV traveling.

Now, a relation between the SOC control and control of the output of engine 2 will be described with reference to FIG. 2.

Figure 2:
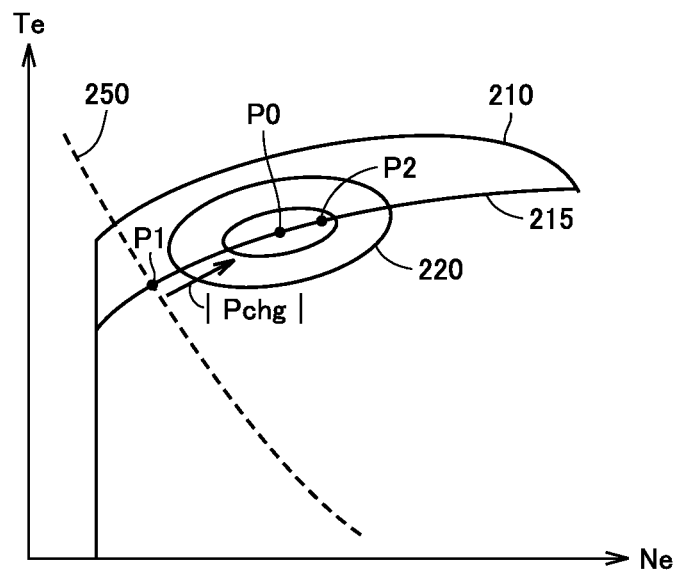
FIG. 2 is a conceptual diagram for describing a relation between SOC control and control of an output of an engine.

Referring to FIG. 2, the horizontal axis in FIG. 2 indicates the engine rotation speed, and the vertical axis in FIG. 2 indicates the engine torque. As shown in FIG. 2, an operating point of engine 2 is defined by a combination of the engine rotation speed and the engine torque.

FIG. 2 shows a maximum torque line 210 and equal fuel efficiency lines 220 of engine 2. Maximum torque line 210 is preliminarily defined as a set of operating points at which engine 2 outputs maximum torque that can be output by engine 2 for each engine rotation speed. Equal fuel efficiency line 220 is a set of operating points that are equal in fuel efficiency, and has an elliptical shape. A plurality of equal fuel efficiency lines indicate that the closer the center of the ellipse is, the more the fuel efficiency is improved.

An equal power line 250 is a set of operating points that are identical in output power of engine 2. Therefore, when the output power requested for engine 2 (hereinafter also referred to as "engine request power Pe") is determined, the operating point of engine 2 can be set on the equal power line corresponding to engine request power Pe.

An optimum fuel efficiency operation line 215 is shown by a set of operating points at which fuel consumption in engine 2 is minimum with respect to the same engine output power. Optimum fuel efficiency operation line 215 can be uniquely determined in advance, based on an experimental result and the like.

Therefore, in order to deal with a change in engine output power, the engine operating point is set on optimum fuel efficiency operation line 215, and thereby, the fuel efficiency of engine 2 can be improved. In other words, from the perspective of fuel efficiency, it is preferable to set the operating point of engine 2 in accordance with an intersection point of optimum fuel efficiency operation line 215 and the equal power line corresponding to engine request power Pe.

Furthermore, on optimum fuel efficiency operation line 215, there is an optimum fuel efficiency operating point P0 at which the thermal efficiency of engine 2 has a highest value, that is, the engine efficiency is maximum. Therefore, if engine 2 operates in accordance with optimum fuel efficiency operating point P0, the fuel efficiency is improved to a maximum extent.

Engine request power Pe is expressed by a sum of the power (traveling power Pr*) required for traveling of hybrid vehicle 100 and charging/discharging request power Pchg of power storage device 16. When engine request power Pe is lower than a prescribed threshold value, engine 2 is stopped and the EV traveling using an output of motor generator 10 is selected. On the other hand, when engine request power Pe is higher than the prescribed threshold value, the HV traveling with the operation of engine 2 is selected.

Traveling power Pr* can be calculated based on a product of the traveling driving force (torque) required for traveling of hybrid vehicle 100 and the number of rotations of drive shaft 12. For example, the traveling driving force (torque) can be calculated based on an amount of operation of an accelerator pedal by the driver and the vehicle speed.

Charging/discharging request power Pchg represents the charging/discharging power of power storage device 16 for the SOC control of power storage device 16. In the following description, charging/discharging request power Pchg is set to be Pchg>0 when discharging of power storage device 16 is urged, and is set to be Pchg<0 when charging of power storage device 16 is urged. Therefore, the relation of Pe=Pr*−Pchg is established.

In the SOC control, charging/discharging request power Pchg is set so as to bring the SOC value of power storage device 16 closer to the SOC target value. In other words, when the SOC value is lower than the SOC target value, charging/discharging request power Pchg is set to be Pchg<0, and thereby, engine request power Pe becomes greater than traveling power Pr. Conversely, when the SOC value is higher than the SOC target value, charging/discharging request power Pchg is set to be Pchg>0, and thereby, engine request power Pe becomes smaller than traveling power Pr.

For example, in the case of charging power storage device 16, charging/discharging request power Pchg is set to be Pchg<0 with respect to operating point P1 on equal power line 250 corresponding to traveling power Pr* in FIG. 2, and thus, the relation of Pe*>Pr is established. As a result, the engine operating point moves toward the high power side (in the upper right direction in the figure) along optimum fuel efficiency operation line 215. As a result, power storage device 16 can be charged with extra engine power (|Pchg-|minute) output in excess of traveling power Pr*.

At this time, the operating point after movement is closer to optimum fuel efficiency operating point P0 than operating point P1 corresponding to traveling power Pr*. Therefore, charging/discharging request power Pchg of power storage device 16 is further output, and thus, a fuel consumption amount of engine 2 increases while the energy efficiency becomes high. In this case, a ratio of the fuel consumption amount used to charge power storage device 16 to the total fuel consumption amount becomes high. In other words, the energy efficiency for charging power storage device 16 (hereinafter also referred to as "charging efficiency") is enhanced.

Generally, it is preferable to set charging/discharging request power Pchg such that addition of charging/discharging request power Pchg does not lead to a decrease in efficiency of engine 2. For example, when the engine operating point corresponding to traveling power Pr* is P2, the engine efficiency decreases if engine request power Pe is more increased than traveling power Pr. In such a case, it is preferable to set charging/discharging request power Pchg to be Pchg=0 to prevent deterioration of the fuel efficiency.

Therefore, in a driving region where traveling power Pr* is high, the ratio of the fuel consumption amount used to charge power storage device 16 to the total fuel consumption amount decreases. In other words, the charging efficiency of power storage device 16 decreases.

As described above, when power storage device 16 is charged during the HV traveling, the aforementioned charging efficiency of power storage device 16 changes in accordance with the operating point corresponding to traveling power Pr*. Which region the engine operating point corresponding to traveling power Pr* is located in changes depending on a driving tendency of the hybrid vehicle, e.g., a driver's driving pattern and a daily traveling path. Therefore, it is understood that even if the SOC target value is the same, the charging efficiency of power storage device 16 changes depending on the driving tendency of the hybrid vehicle.

For example, when the driver's operation of the accelerator tends to be abrupt, or when hybrid vehicle 100 routinely travels a path with many ups and downs, the engine operating point is located in a high power region with high frequency in FIG. 2, and thus, the charging efficiency of power storage device 16 tends to decrease. On the other hand, when the driver's operation of the accelerator tends to be slow, or when a frequency of cruise traveling on a flat road is high, the charging efficiency of power storage device 16 tends to increase.

Referring again to FIG. 1, hybrid vehicle 100 is configured such that the user can forcibly select the EV traveling in response to operation of EV traveling request switch 29. For example, EV traveling request switch 29 is turned on at the time of traveling in a residential area, and thereby, hybrid vehicle 100 can travel in consideration of the surrounding environment. When EV traveling request switch 29 is turned on, a request signal Rev is input to ECU 25.

Alternatively, hybrid vehicle 100 may be configured such that power mode traveling (a traveling mode in which the vehicle acceleration is enhanced with respect to the operation of the accelerator pedal) is selected in response to operation of power mode switch 30. When power mode switch 30 is turned on, a request signal Rpw is input to ECU 25. When power mode switch 30 is turned on, the torque generated by motor generator 10 by using the electric power from power storage device 16 is set to be higher than usual, and thereby, the vehicle acceleration can be enhanced.

On the other hand, in order to execute the EV traveling in response to turning on EV traveling request switch 29 and the power mode traveling in response to turning on power mode switch 30, it is necessary to ensure the SOC of power storage device 16. Therefore, hybrid vehicle 100 according to the first embodiment is provided with SOC recovery switch 28 for the user to request charging amount recovery control (hereinafter also referred to as "SOC recovery control") for increasing the SOC of power storage device 16 to the target value.

When SOC recovery switch 28 is turned on by the user, a request signal Rsoc is input to ECU 25. Instead of SOC recovery switch 28, voice input means or the like may be used such that the user can request the mode of increasing the amount of stored power. Namely, SOC recovery switch 28 corresponds to one example of "input device".

For example, in preparation for the EV traveling executed in response to turning on EV traveling request switch 29 and the power mode traveling executed in response to turning on power mode switch 30, the user can preliminarily increase the SOC value by an SOC recovery mode. As a result, these EV traveling and power mode traveling can be continued for a certain period.

Alternatively, when hybrid vehicle 100 has a function of converting, by an inverter, the electric power stored in power storage device 16 into the electric power (e.g., 100 VAC) equivalent to that of a commercial system power supply, and supplying the electric power to outside the vehicle, the SOC value can be increased during traveling, in preparation for power feeding after arrival at a destination (such as a campsite). As described above, the SOC recovery mode is provided, and thus, it is possible to respond to the user's request to increase the SOC.

Figure 3:
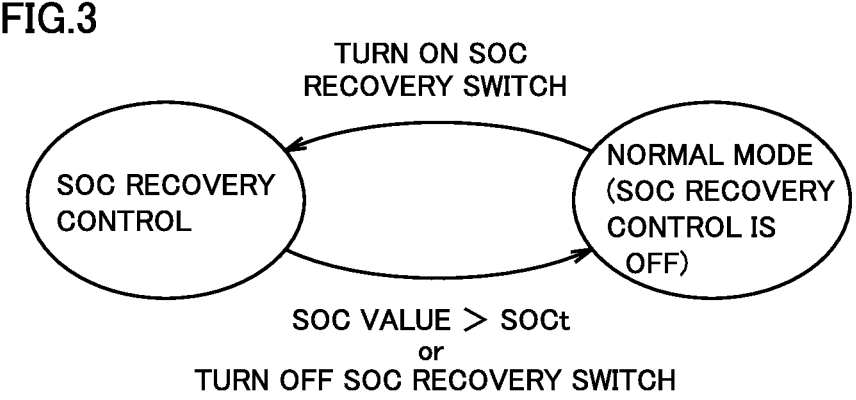
FIG. 3 is a state transition diagram in relation to operation of an SOC recovery switch shown in FIG. 1.

FIG. 3 shows a state transition diagram in relation to the operation of SOC recovery switch 28.

Referring to FIG. 3, upon reception of request signal Rsoc from SOC recovery switch 28, ECU 25 executes the SOC recovery control for increasing the SOC of power storage device 16 to the target value.

In the SOC recovery control, the SOC target value in the SOC control is set to be higher than that in the normal mode (when the SOC recovery control is not in execution). Basically, similarly to the SOC control at the normal time, in the SOC recovery control as well, charging/discharging request power Pchg is set to be Pchg<0 until the SOC value reaches the SOC target value. Furthermore, in order to set a charging rate (a charging amount per unit time) of power storage device 16 to be higher than that at the normal time, charging/discharging request power Pchg (Pchg<0) may be set such that an absolute value (|Pchg|) of the charging/discharging request power with respect to the same SOC deviation (a deficit of the SOC value with respect to the SOC target value) becomes large. In a situation where the charging/discharging power of power storage device 16 is restricted such as when the temperature of power storage device 16 is low and when the temperature of power storage device 16 is high, there is a possibility that charging/discharging with the electric power smaller than charging/discharging request power Pchg in the SOC control is only permitted.

Referring again to FIG. 2, for example, when the engine operating point corresponding to traveling power Pr* is located closer to the low power side than optimum fuel efficiency operating point P0 at the time of execution of the SOC recovery control, |Pchg| described above is extended, and thereby, charging/discharging request power Pchg (Pchg<0) can be set such that the engine operating point is constantly shifted to optimum fuel efficiency operating point P0. As a result, the charging efficiency in the SOC recovery control can be more enhanced than that in the normal mode. In other words, both when the SOC recovery control is in execution and when the SOC recovery control is not in execution, the charging efficiency of power storage device 16 changes in accordance with the engine operating point corresponding to traveling power Pr*. Therefore, whether the charging efficiency of power storage device 16 is higher in the SOC recovery control or in the normal mode (when the SOC recovery control is not in execution) can change depending on the aforementioned driving tendency of the vehicle.

If the charging efficiency of power storage device 16 is higher in the SOC recovery control than in the normal mode, the charging amount in the SOC recovery control is increased, and thereby, the fuel efficiency of the vehicle can be improved. Therefore, in the present embodiment, the SOC recovery control is applied such that the charging amount in the SOC recovery control can be changed based on the past driving history data that reflects the driving tendency of hybrid vehicle 100.

Figure 4:
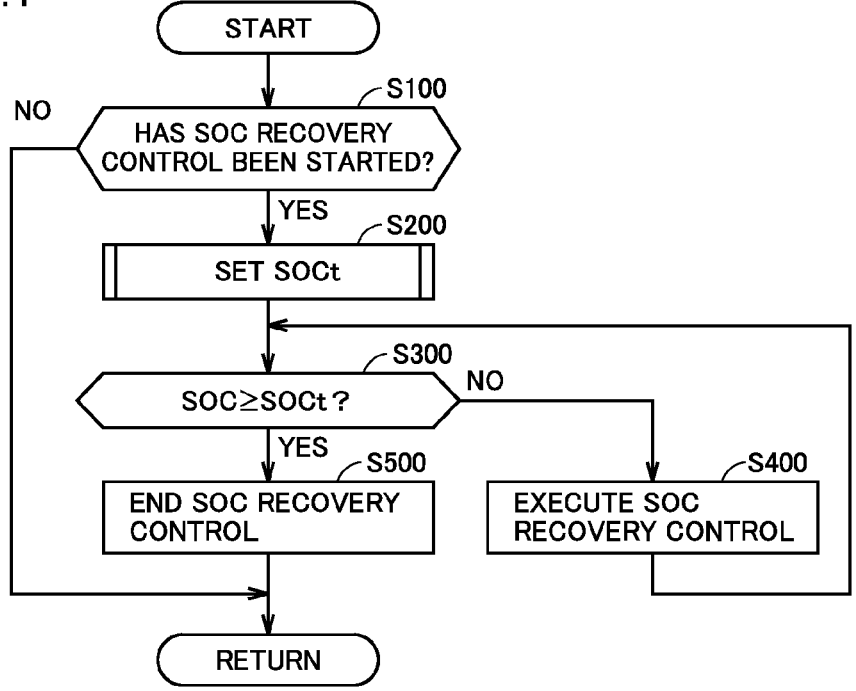
FIG. 4 is a flowchart for describing a process procedure of SOC recovery control in the hybrid vehicle shown in FIG. 1.

FIG. 4 is a flowchart showing a control process related to the SOC recovery mode in the hybrid vehicle shown in FIG. 1. The control process shown in the flowchart in FIG. 4 is repeatedly executed by ECU 25.

Referring to FIG. 4, in step S100, ECU 25 determines whether the SOC recovery control has been started or not. In step S100, when SOC recovery switch 28 is turned on by the user in the normal mode, determination of YES is made in response to generation of request signal Rsoc.

If the SOC recovery control has been started (YES in S100), ECU 25 sets an SOC target value SOCt in the SOC recovery control based on the driving history of hybrid vehicle 100 in step S200. Namely, SOC target value SOCt corresponds to an SOC threshold value for determining the end of the SOC recovery control.

Then, in step S300, ECU 25 compares the SOC value of power storage device 16 with SOC target value SOCt set in step S200. If the SOC value reaches SOCt (YES in S300), ECU 25 ends the SOC recovery control in step S500.

On the other hand, during a period in which the SOC value is lower than SOCt (NO in S300), ECU 25 executes the SOC recovery control in step S400. As described with reference to FIG. 3, in the case as well where SOC recovery switch 28 is operated during execution of the SOC recovery control, determination of YES is made in step S300 and the SOC recovery control is ended (S500).

Now, a control process for storing the driving history data of hybrid vehicle 100 which is used in step S200 will be described with reference to the flowchart in FIG. 5. The control process shown in the flowchart in FIG. 5 is repeatedly executed by ECU 25 at prescribed cycles at least when the SOC recovery control is not in execution (in the normal mode).

Figure 5:
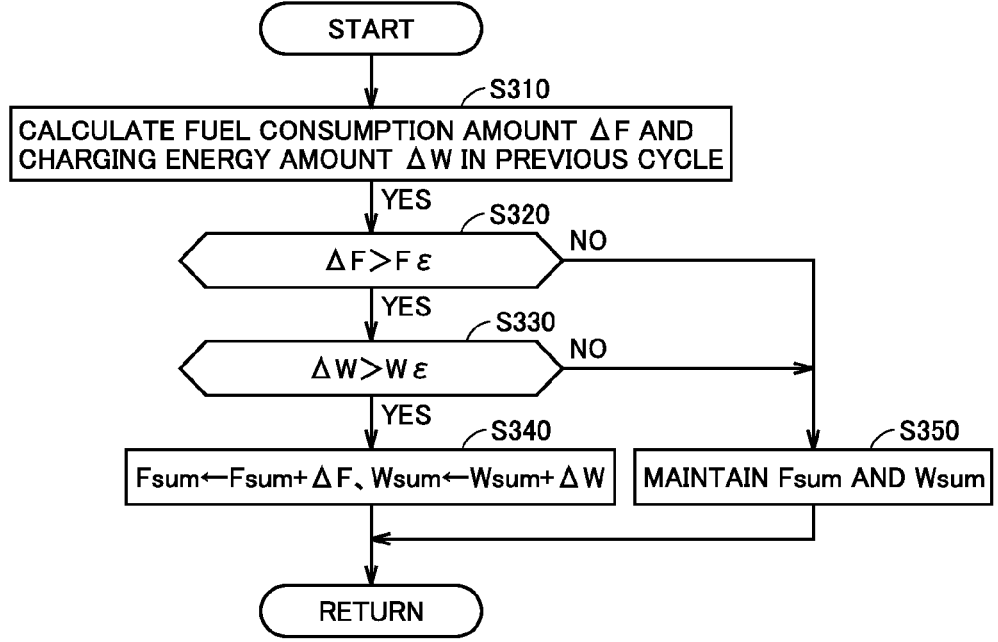
FIG. 5 is a flowchart for describing a control process for storing driving history data of the hybrid vehicle.

Referring to FIG. 5, in step S310, ECU 25 calculates a fuel consumption amount $\Delta F$ of engine 2 and a charging energy amount $\Delta W$ of power storage device 16 in the previous cycle. For example, fuel consumption amount $\Delta F$ can be calculated based on summation of an amount of fuel injection in engine 2 in the cycle. In addition, charging energy amount $\Delta W$ can be calculated based on summation of the input/output current of power storage device 16 in the cycle.

Furthermore, in step S320, ECU 25 compares fuel consumption amount $\Delta F$ with a determination value $F\epsilon$. Determination value $F\epsilon$ is substantially set to achieve $\Delta F>0$, that is, to detect the operation of engine 2. Similarly, in step S330, ECU 25 compares charging energy amount $\Delta W$ with a determination value $W\epsilon$. Determination value $W\epsilon$ is substantially set to achieve $\Delta W>0$, that is, to detect that power storage device 16 is being charged.

During a period in which power storage device 16 is charged during the HV traveling in which engine 2 is operated (YES in S320 and S330), ECU 25 adds fuel consumption amount $\Delta F$ and charging energy amount $\Delta W$ to values of a fuel consumption amount summed value Fsum and a charging energy summed value Wsum in the previous cycle, respectively, in step S340.

On the other hand, if determination of NO is made in step S320 or S330, ECU 25 maintains the values of fuel consumption amount summed value Fsum and charging energy summed value Wsum in the previous cycle, without adding fuel consumption amount $\Delta F$ and charging energy amount $\Delta W$ (step S350).

As a result, fuel consumption amount summed value Fsum and charging energy summed value Wsum during the period in which power storage device 16 is charged during the HV traveling and when the SOC recovery control is not in execution (in the normal mode) can be stored as the driving history data of hybrid vehicle 100.

Furthermore, during an execution period (an ON period) of the SOC recovery control as well, ECU 25 executes the control process in accordance with the flowchart in FIG. 5, and thereby, the driving history data can be stored separately from the non-execution period of the SOC recovery control (the normal mode). In other words, fuel consumption amount summed value Fsum and charging energy summed value Wsum include a fuel consumption amount summed value Fsum(1) and a charging energy summed value Wsum(1) during the SOC recovery control OFF period (in the normal mode) as well as a fuel consumption amount summed value Fsum(2) and a charging energy summed value Wsum(2) during the execution period of the SOC recovery control. Fsum(1) and Fsum(2) are separately summed, and Wsum(1) and Wsum(2) are separately summed.

Figure 6:
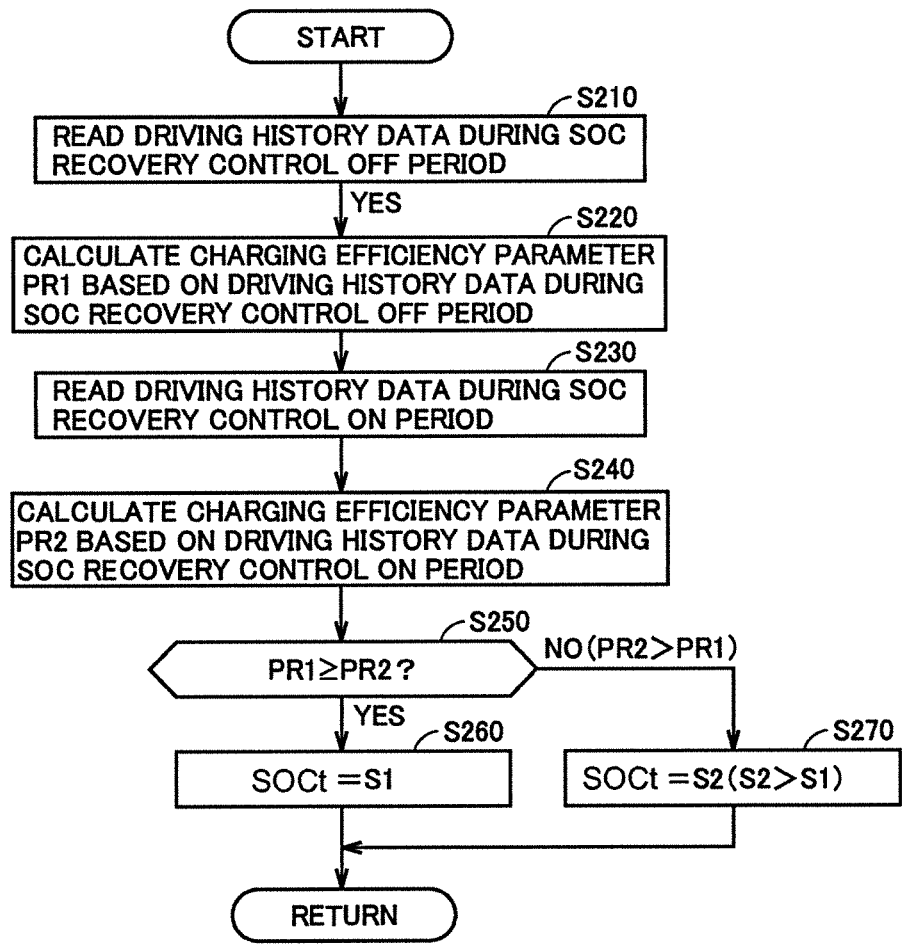
FIG. 6 is a flowchart for describing a process for setting an SOC target value in the SOC recovery control according to the first embodiment.

FIG. 6 shows a flowchart for describing a control process for setting SOC target value SOCt in the SOC recovery control in step S200 in FIG. 4.

Referring to FIG. 6, in step S210, ECU 25 reads the driving history data during the past non-execution period (the OFF period) of the SOC recovery control. In step S210, fuel consumption amount summed value Fsum(1)[g] and charging energy summed value Wsum(1)[J] summed by the process shown in FIG. 5 are, for example, read.

In step S220, ECU 25 calculates a charging efficiency parameter PR1 [J/g] in the normal mode (during the SOC recovery control OFF period), based on the driving history data read in step S210. Charging efficiency parameter PR1 can be calculated in accordance with, for example, PR1=Wsum(1)/Fsum(1).

Furthermore, in step S230, ECU 25 reads the driving history data during the past SOC recovery control ON period. In step S230, fuel consumption amount summed value Fsum(2) [g] and charging energy summed value Wsum(2) [J] are, for example, read.

In step S240, ECU 25 calculates a charging efficiency parameter PR2[J/g] during the past SOC recovery control, based on the driving history data read in step S230. Charging efficiency parameter PR2 can be calculated in accordance with, for example, PR2=Wsum(2)/Fsum(2).

Then, in step S250, ECU 25 compares charging efficiency parameters PR1 and PR2 calculated in steps S220 and S240. In other words, ECU 25 estimates that the charging efficiency in this time's SOC recovery control is equivalent to the charging efficiency in the past SOC recovery control.

If charging efficiency parameter PR1 is equal to or higher than charging efficiency parameter PR2 (YES in S250), ECU 25 sets SOC target value SOCt in the SOC recovery control at a default value S1 (SOCt=S1) in step S260. For example, the target SOC in the SOC control in the normal mode is approximately 50 to 60(%), while S1 is set at approximately 70(%).

In contrast, if charging efficiency parameter PR2 is higher than charging efficiency parameter PR1 (NO in S250), ECU 25 sets SOC target value SOCt in the SOC recovery control at S2 which is higher than default value S1 (SOCt=S2) in step S270. For example, S2 is set at approximately 75 to 80(%).

As described above, in the hybrid vehicle according to the first embodiment, the SOC target value in the SOC recovery control can be variably set based on the past driving history data of hybrid vehicle 100. Particularly, when the charging efficiency tends to be higher in the SOC recovery control than in the normal mode (when the SOC recovery control is not in execution) based on the driving history data in the SOC recovery control and the driving history data in the normal mode (when the SOC recovery control is not in execution), the SOC target value can be increased and the charging amount in the SOC recovery control can be increased. Conversely, when the charging efficiency tends to be lower in the SOC recovery control, the charging amount in the SOC recovery control can be suppressed.

As a result, the energy efficiency for charging power storage device 16 can be enhanced and the fuel efficiency of hybrid vehicle 100 can be improved. Namely, the target SOC (SOCt) corresponding to the threshold value for ending the SOC recovery control is applied based on the past driving history of hybrid vehicle 100, and thereby, the fuel efficiency of the hybrid vehicle can be enhanced.

Second Embodiment

In the first embodiment, charging efficiency parameter PR2 has been estimated based on the traveling history in the past SOC recovery control. Actually, however, the charging efficiency in the SOC recovery control depends on the driving situation during the SOC recovery control. Therefore, in a second embodiment, charging efficiency parameter PR2 is predictively calculated based on the engine operating point at the start of the SOC recovery control, thereby estimating the charging efficiency. It is to be noted that the second embodiment is the same as the first embodiment except for setting the SOC target value in the SOC recovery control.

Figure 7:
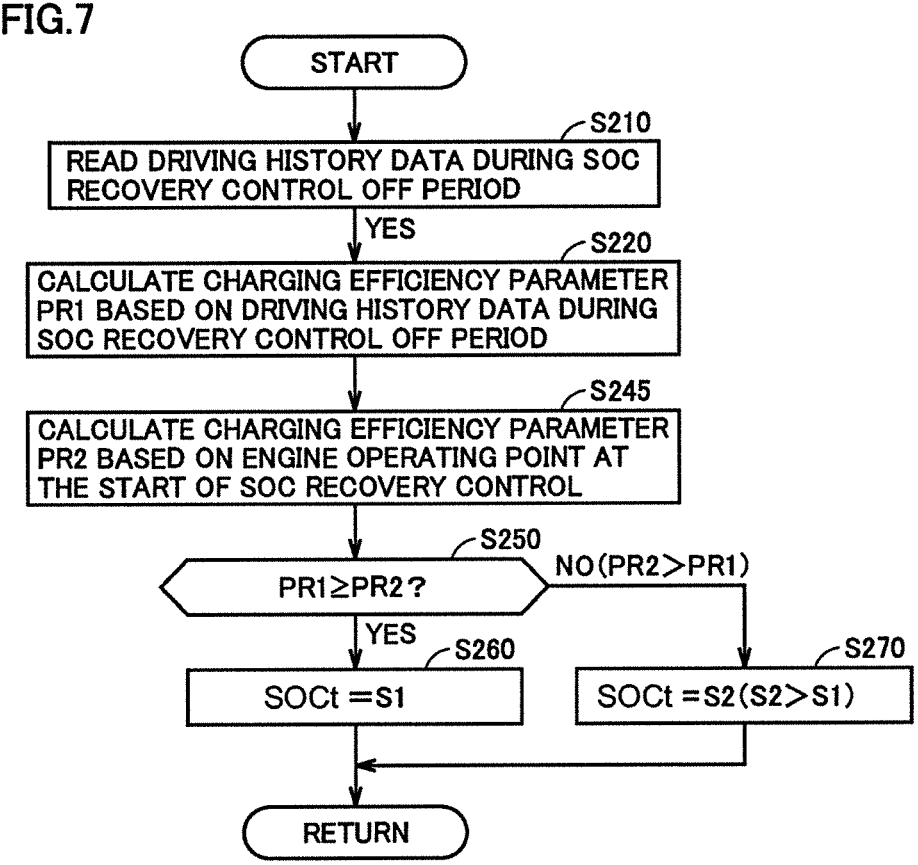
FIG. 7 is a flowchart for describing a process for setting an SOC target value in SOC recovery control according to a second embodiment.

FIG. 7 is a flowchart for describing a process for setting the SOC target value in the SOC recovery control according to the second embodiment. Instead of the control process shown in FIG. 6, the control process in accordance with the flowchart in FIG. 7 is executed in step S200 of the SOC recovery control (FIG. 4) described in the first embodiment.

Referring to FIG. 7, in steps S210 and S220 that are the same as those in FIG. 6, ECU 25 calculates charging efficiency parameter PR1 (PR1=Wsum(1)/Fsum(1)) in the normal mode (during the SOC recovery control OFF period), based on the past driving history data during the SOC recovery control OFF period (in the normal mode).

Furthermore, instead of steps S230 and S240 in FIG. 6, ECU 25 calculates charging efficiency parameter PR2 in the SOC recovery control in step S245. In step S245, ECU 25 predictively calculates charging efficiency parameter PR2 based on the engine operating point at the start of the SOC recovery control.

Referring again to FIG. 2, assuming that the engine operating point at the start of the SOC recovery control is P1, charging power Pc[W] of power storage device 16 can be estimated based on a power difference between optimum fuel efficiency operating point P0 and operating point P1, that is, a difference between the engine power at the start of the SOC recovery control and engine power Pr at optimum fuel efficiency operating point P0. Engine power Pr[W] as well as a fuel consumption rate Fr[g/sec] which is a fuel consumption amount for one second at optimum fuel efficiency operating point P0 can be preliminarily obtained based on an experimental result and the like. Furthermore, an efficiency parameter η defined by the charging power with respect to the output power of engine 2, in which a loss caused by energy conversion during charging is taken into consideration, is preliminarily set based on an experimental result and the like, and thereby, charging efficiency parameter PR2[J/g] in the SOC recovery control can be calculated in accordance with the following equation (1):

$$PR2=(Pc\cdot\eta)/Fr \quad (1).$$

Furthermore, in step S250 that is the same as that in FIG. 6, ECU 25 compares charging efficiency parameter PR1 during the normal mode (the SOC recovery control OFF period) based on the past driving history data and charging efficiency parameter PR2 in the SOC recovery control calculated in step S245.

Setting the SOC target value (SOCt) in the SOC recovery control based on the comparison between charging efficiency parameters PR1 and PR2 is the same as that in the first embodiment, and thus, detailed description will not be repeated (S260, S270).

As described above, in the hybrid vehicle according to the second embodiment, the charging efficiency in the SOC recovery control can be estimated based on the engine operating point at the start of the SOC recovery control. Therefore, as compared with the first embodiment, the accuracy of estimating the charging efficiency in the SOC recovery control can be enhanced. As a result, whether to increase the charging amount in the SOC recovery mode or not is determined more appropriately in accordance with charging efficiency parameter PR2, and thereby, the fuel efficiency of the hybrid vehicle can be enhanced.

Modification of Second Embodiment

It is feared that the prediction accuracy decreases when charging efficiency parameter PR2 is calculated based on the engine operating point at the time of idle operation of engine 2 or the engine operating point during accelerated traveling in step S245 according to the second embodiment. Therefore, it is preferable to execute setting of the SOC target value in the SOC recovery control according to the second embodiment, only when engine 2 is not in an idle operation state and hybrid vehicle 100 is traveling at constant speed at the start of the SOC recovery control.

Figure 8:
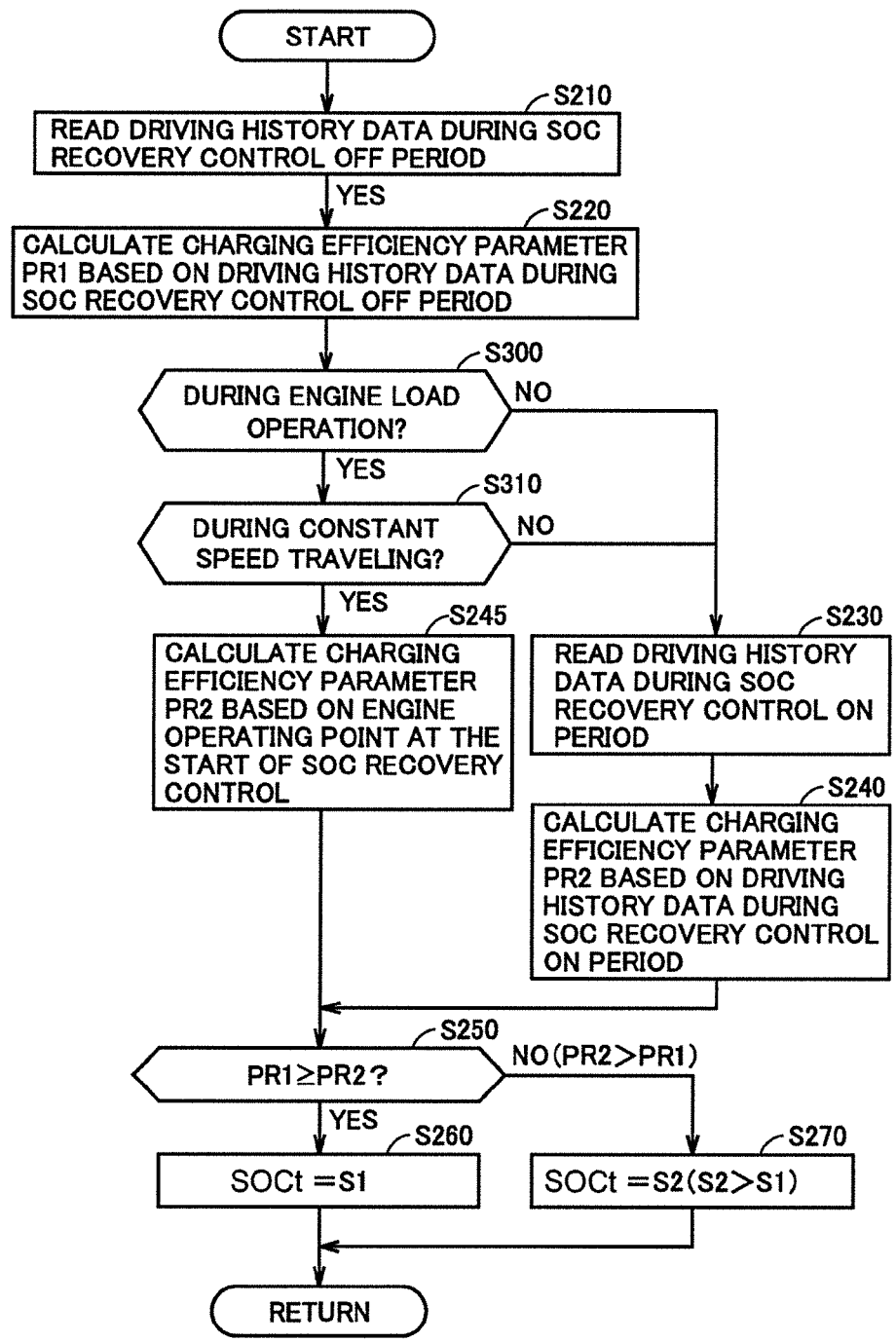
FIG. 8 is a flowchart for describing a process for setting an SOC target value in SOC recovery control according to a modification of the second embodiment.

FIG. 8 is a flowchart for describing a process for setting the SOC target value in the SOC recovery control according to a modification of the second embodiment. Instead of the control processes shown in FIGS. 6 and 7, the control process in accordance with the flowchart in FIG. 8 is executed in step S200 of the SOC recovery control (FIG. 4) described in the first embodiment.

Referring to FIG. 8, in steps S210 and S220 that are the same as those in FIGS. 6 and 7, ECU 25 calculates charging efficiency parameter PR1 (PR1=Wsum(1)/Fsum(1)) in the normal mode (during the SOC recovery control OFF period), based on the past driving history data during the SOC recovery control OFF period (in the normal mode).

Furthermore, in step S300, ECU 25 determines whether hybrid vehicle 100 is in load operation or not, and in step S310, ECU 25 determines whether hybrid vehicle 100 is traveling at constant speed or not.

The determination in step S300 can be executed based on the current engine operating point. As a result, when engine 2 is in idle operation, determination of NO is made in step S300. In addition, by separately executing a subroutine process for monitoring a transition of the vehicle speed, the determination in step S310 can be executed based on an amount of change in vehicle speed within a certain time period.

When engine 2 is not in idle operation (in load operation) and hybrid vehicle 100 is traveling at constant speed at the start of the SOC recovery control, determination of YES is made in both steps S300 and S310, and thus, ECU 25 moves the process to step S245. Similarly to FIG. 7, in step S245, ECU 25 predictively calculates charging efficiency parameter PR2 based on the engine operating point at the start of the SOC recovery control.

On the other hand, when engine 2 is in idle operation or hybrid vehicle 100 is traveling with acceleration and deceleration at the start of the SOC recovery control, determination of NO is made in either step S300 or S310, and thus, ECU 25 moves the process to steps S230 and S240. Similarly to FIG. 6, in steps S230 and S240, charging efficiency parameter PR2 is calculated based on the driving history data during the past execution period of the SOC recovery control.

Furthermore, in step S250 that is the same as that in FIG. 6, ECU 25 compares charging efficiency parameter PR1 during the normal mode (the SOC recovery control OFF period) based on the past driving history data and charging efficiency parameter PR2 in the SOC recovery control calculated in step S240 or S245.

Setting the SOC target value (SOCt) in the SOC recovery control based on the comparison between charging efficiency parameters PR1 and PR2 is the same as those in the first and second embodiments, and thus, detailed description will not be repeated (S260, S270).

According to the modification of the second embodiment, in the case of a traveling situation in which the charging efficiency in this time's SOC recovery control can be predicted based on the engine operating point at the start of the SOC recovery control, the second embodiment can be applied and charging efficiency parameter PR2 can be predicted. For example, in such a situation that the hybrid vehicle is cruise traveling on an expressway at relatively low load, enhancement of the charging efficiency in the SOC recovery control can be expected. According to the modification of the second embodiment, in such a traveling situation, the SOC target value in the SOC recovery control is increased to correspond to the engine operating point at the start of the SOC recovery control, and thereby, enhancement of the fuel efficiency can be expected.

On the other hand, in the case where it is difficult to predict the charging efficiency in this time's SOC recovery control based on the engine operating point at the start of the SOC recovery control, the SOC target value in the SOC recovery control can be properly set based on the driving history during the past execution period of the SOC recovery control.

Modification of Configuration of Hybrid Vehicle

In the first and second embodiments and the modification thereof, description has been given to the SOC recovery control in the hybrid vehicle configured such that engine 2 and two motor generators 6 and 10 are coupled by power split device 4 as shown in FIG. 1. However, the hybrid vehicle to which the present invention is applied is not limited to such a configuration.

Namely, the present invention is commonly applicable to a hybrid vehicle having a vehicle configuration in which a charging amount (SOC) of a power storage device can be increased by using an output of an engine and having a mode (the SOC recovery mode in the present embodiment) of increasing the SOC to a target value in accordance with user's selection.

Figure 9:
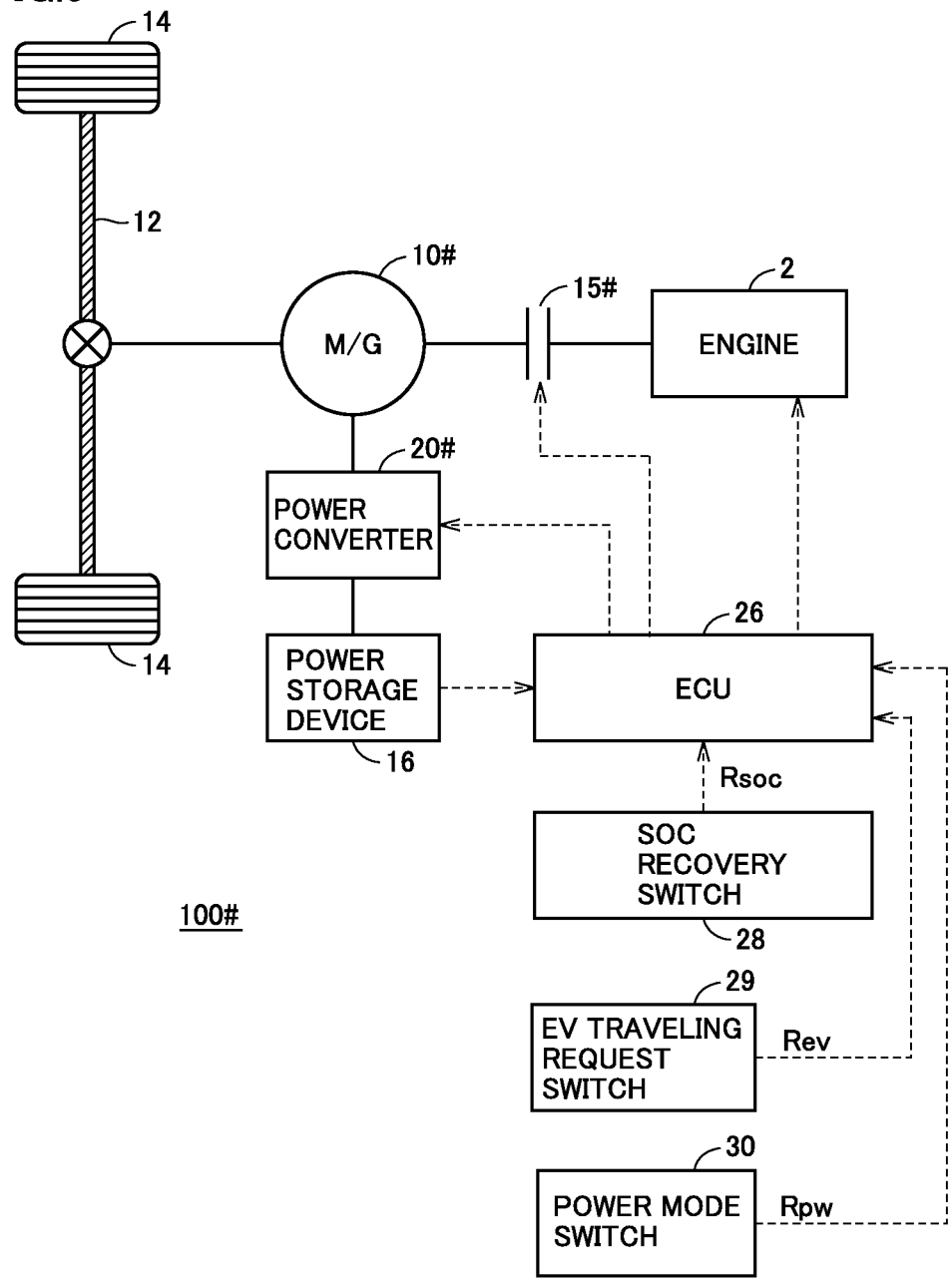
FIG. 9 is a block diagram for describing one modification of the overall configuration of the hybrid vehicle.

For example, the SOC recovery mode described in the first and second embodiments and the modification thereof is also applicable to a hybrid vehicle 100# configured such that engine 2 and one motor generator 10# are serially coupled by a clutch 15# as shown in FIG. 9.

In hybrid vehicle 100# shown in FIG. 9 as well, by bringing clutch 15# into a coupled state and setting an output of engine 2 to be higher than the traveling power, power storage device 16 can be charged via AC/DC power conversion by a power converter 20#, through power generation by motor generator 10# using the output of engine 2. Therefore, similarly to hybrid vehicle 100, the SOC of power storage device 16 can be controlled by adjusting the output of engine 2.

In addition, the example of variably setting the SOC target value in the SOC recovery control in two stages (S1, S2) has been described in the first and second embodiments and the modification thereof. However, the SOC target value can also be variably set in three or more stages.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle including a mechanism for generating vehicle driving force by using electric power from a power storage device, the hybrid vehicle comprising:
   an internal combustion engine;
   a power generation mechanism for generating charging power of said power storage device by using an output of said internal combustion engine;
   an input device for a user to select charging amount recovery control for increasing an amount of charge stored in said power storage device to a target value; and
   a control device for controlling vehicle traveling with control of said amount of charge, wherein
   said control device is configured to set said target value in said charging amount recovery control based on a past driving history of said hybrid vehicle, when said charging amount recovery control is started in response to operation of said input device, and
   said past driving history includes both a past history with regard to an operation of the internal combustion engine and a past history with regard to charging of the power storage device, during a non-execution period of said charging amount recovery control.

2. The hybrid vehicle according to claim 1, wherein said past driving history includes summed values of a fuel consumption amount of said internal combustion engine and the amount of charge charged in said power storage device during said non-execution period of said charging amount recovery control.

3. The hybrid vehicle according to claim 1, wherein said control device is configured to calculate a first charging efficiency parameter based on said past driving history and estimate a second charging efficiency parameter when said charging amount recovery control is started, said first charging efficiency parameter being expressed by a ratio of the amount of charge charged in said power storage device to a fuel consumption amount of said internal combustion engine during said non-execution period of said charging amount recovery control, and said second charging efficiency parameter being expressed by a ratio of the amount of charge charged in said power storage device to a fuel consumption amount of said internal combustion engine in said charging amount recovery control at present, and said control device is further configured to increase said target value more when said second charging efficiency parameter is higher than said first charging efficiency parameter than when said first charging efficiency parameter is higher than said second charging efficiency parameter.

4. The hybrid vehicle according to claim 3, wherein said control device is configured to estimate said second charging efficiency parameter based on said past driving history during a previous execution period of said charging amount recovery control, when said charging amount recovery control is started.

5. The hybrid vehicle according to claim 3, wherein said control device is configured to estimate said second charging efficiency parameter based on an operating point of said internal combustion engine at the start of said charging amount recovery control.

6. The hybrid vehicle according to claim 3, wherein said control device is configured to estimate said second charging efficiency parameter based on an operating point of said internal combustion engine, when said internal combustion engine is in load operation and said hybrid vehicle is traveling at constant speed at the start of said charging amount recovery control.

7. The hybrid vehicle according to claim 6, wherein said control device is configured to estimate said second charging efficiency parameter based on said past driving history during a previous execution period of said charging amount recovery control, when said internal combustion engine is in idle operation or said hybrid vehicle is traveling with acceleration and deceleration at the start of said charging amount recovery control.

8. A control method for a hybrid vehicle including an internal combustion engine and a mechanism for generating vehicle driving force by using electric power from a power storage device, the control method comprising the steps of:

during vehicle traveling, in accordance with a user's instruction, starting charging amount recovery control for increasing an amount of charge stored in said power storage device to a target value by a power generation mechanism for generating charging power of said power storage device by using an output of said internal combustion engine;

reading a past driving history of said hybrid vehicle when said charging amount recovery control is started; and setting said target value in said charging amount recovery control, based on the read past driving history, wherein said past driving history includes both a past history with regard to an operation of the internal combustion engine and a past history with regard to charging of the power storage device, during a non-execution period of said charging amount recovery control.

* * * * *